Nov. 16, 1954    R. GOUIRAND    2,694,569
PNEUMATIC SUSPENSION DEVICE FOR VEHICLES
Filed Dec. 4, 1952    2 Sheets-Sheet 1

INVENTOR.
Rene Gouirand
BY Harry Radzinski
ATTORNEY

INVENTOR.
Rene Gouirand
BY Harry Radzinsky
ATTORNEY

United States Patent Office 2,694,569
Patented Nov. 16, 1954

2,694,569
PNEUMATIC SUSPENSION DEVICE FOR VEHICLES

Rene Gouirand, New York, N. Y.

Application December 4, 1952, Serial No. 323,990

10 Claims. (Cl. 267—65)

This invention relates to pneumatic suspensions for vehicles, such as automobiles, trailers, trucks, railway cars and other wheeled conveyances.

It is an object of the invention to provide a simple and economical pneumatic suspension adapted to support both light and heavy loads with equal facility because of the ability to control the pneumatic pressure employed in the device, to meet the requirements of the imposed load.

It is an object of the invention to provide a means for floatingly supporting the load on an air cushion of wide expanse disposed between the wheels of the vehicle; for effectively controlling the side sway of the vehicle and assuring smooth and easy riding despite the transportation of heavy loads.

These objects, and others to be hereinafter disclosed, are obtained through the use of the novel construction to be described and claimed.

In the accompanying drawings, wherein several illustrative embodiments of the invention are disclosed, Fig. 1 is a top plan view of a pair of rear wheels on a trailer, truck or other vehicle, showing the pneumatic suspension with parts broken away, and other parts shown in section, to disclose construction;

Figure 1:
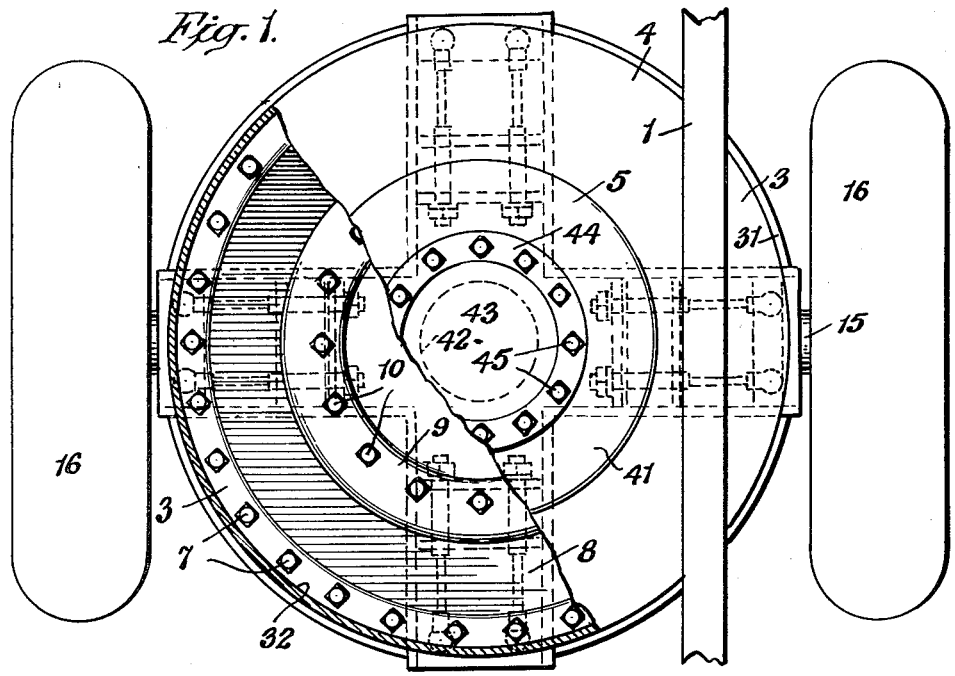
Figure 2:
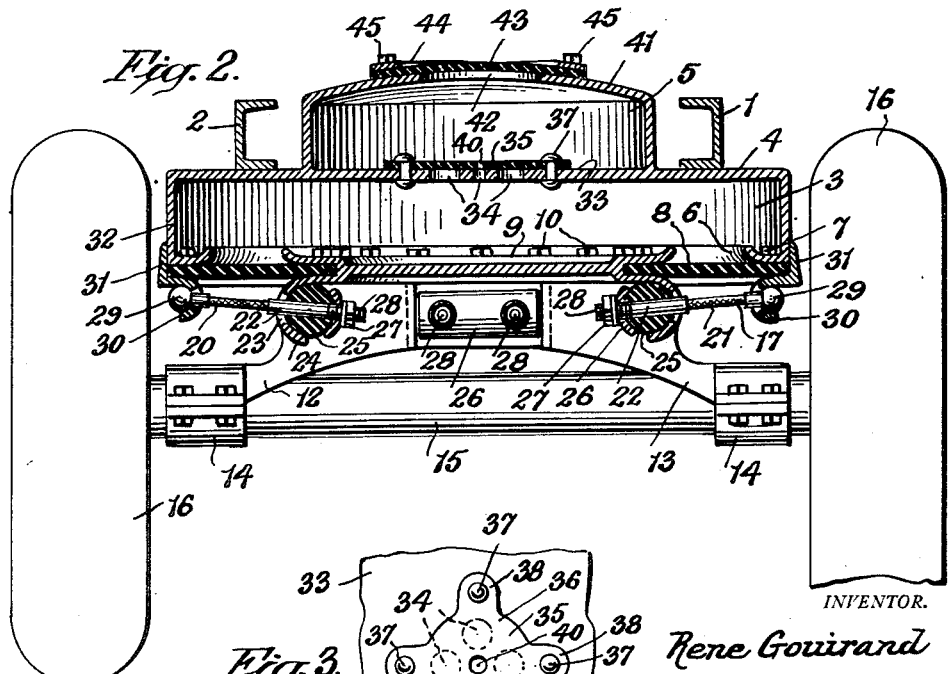
Fig. 2 is a transverse sectional view through the structure shown in Fig. 1.
Figure 4:
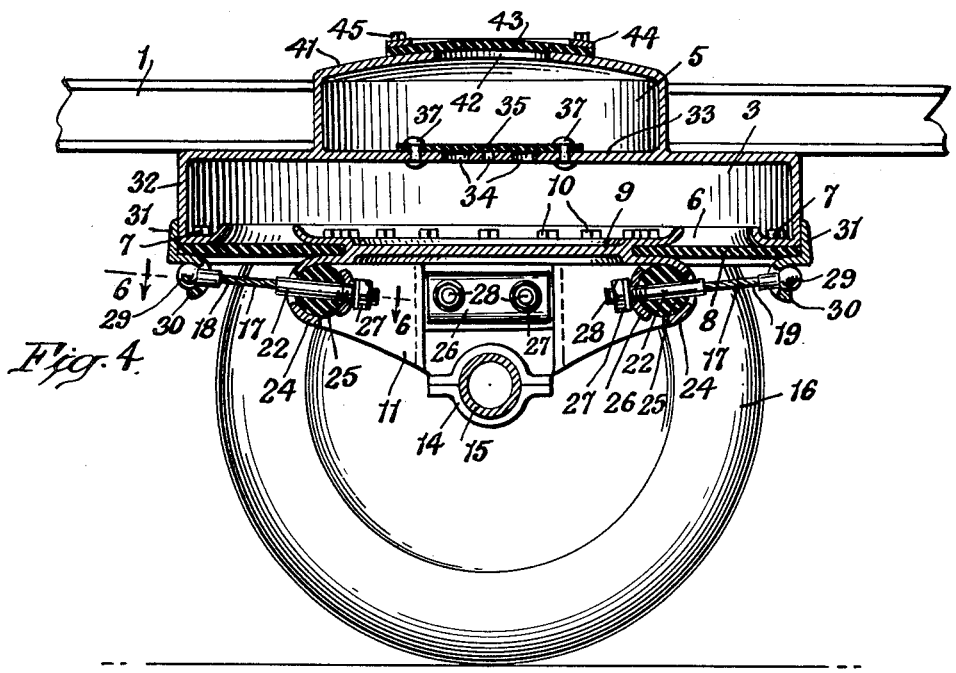
Fig. 4 is a sectional view through the construction shown in Fig. 1, the section being taken at right angles to that of Fig. 2.

Referring to the drawings, and particularly to Figs. 1, 2 and 4, there is therein shown the longitudinal frame members 1 and 2 of the chassis frame of conventional construction. The body of the vehicle, which might be a trailer, truck or other vehicle is supported on these frame elements in the conventional manner. Secured to the frame members 1 and 2 by any suitable means is a pneumatic chamber having a lower or main compartment indicated at 3. The said main portion 3 of the chamber is in the form of a relatively flat cylinder having an annular top portion 4 to which the frame members 1 and 2 are attached. Located between the frame members 1 and 2 is an upward extension 5 of the lower chamber 3, said extension constituting an auxiliary air chamber into which air is directed from the main chamber 3 when a shock is imposed on the vehicle wheels, in a manner to be hereinafter explained.

At its lower end, the main chamber 3 is provided with an inturned annular flange 6, to which is secured, as by the bolts 7, the outer marginal edge portion of an annular diaphragm 8. This diaphragm 8 is preferably composed of flexible elastic material such as, for example, vulcanized rubber in which is embedded cord or fabric to impart the necessary strength to the diaphragm. At its inner edge, the annular diaphragm 8 is extended into the channelled edge portion of a disk 9. Bolts 10 are employed for securing the inner edge of the annular diaphragm 8 to the edge of the disk 9. Through the arrangement described, it will be apparent that the chamber 3 is hermetically sealed and will retain air under pressure provided within it to meet the requirements of the load imposed on the vehicle. Known means such as shown for example in my pending application Serial Number 27,966 may be provided for regulating the air pressure in the chamber.

The disk 9, which is of strong and rugged construction, may be secured to or form a part of a cradle 11 which includes a pair of transverse arms 12 and 13, each of which is provided at its outer end with a clamp 14 which embraces and is secured about the axle 15 of the vehicle, and on which the wheels 16 are carried in the conventional manner. If the vehicle is motor driven, the axle 15 may be provided with the usual differential mechanism in the known manner.

Figure 6:
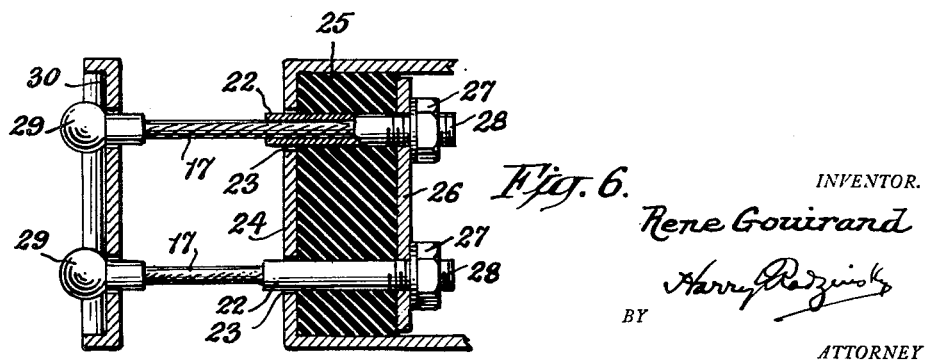
Fig. 6 is a sectional view, taken substantially on the line 6—6 of Fig. 4, looking in the direction of the arrows.

To restrain side sway and to provide a snubbing action, cables 17 are provided, the details of which are disclosed in Fig. 6. The cables are arranged in pairs, one pair of which is extended forwardly, as indicated at 18 in Fig. 4. A second pair of the cables is directed rearwardly, as indicated at 19. Two pairs of cables, indicated respectively at 20 and 21 extend transversely at locations between the wheels of the vehicle. Additional sets of these cables may be provided if found necessary. At its inner end, each of the cables is anchored in a sleeve 22, slidable through an aperture 23 in the curved wall 24 of a downwardly-extending part of the cradle 11 or actually a lower part of the disk 9. The sleeve 22 extends through a cylinder 25 of rubber or other compressible and resilient material maintained against the concave side of the wall 24 by a curved plate 26. The effective length of the cable 17 is adjustable by the nut 27 threadable on the threaded end portion 28 of the sleeve 22. At its opposite end, each of the cables 17 terminates in a ball head 29 which rests against a curved seat 30 constituting an under part of a flange 31 extending around the side wall 32 of the pneumatic chamber 3. The description just given of one of the pairs of cables applies to the other pairs, and the cables, arranged in the manner described, act to very effectively prevent side sway as well as act as snubbers.

Figure 3:
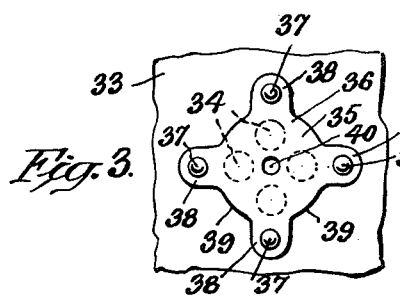
Fig. 3 is a top plan view of the relief valve.

The upper or auxiliary air chamber 5, forming an upward continuation of the lower and larger portion 3 of the pneumatic chamber, is provided with a bottom wall 33 constituting a horizontal partition between the chambers 3 and 5, and formed with a plurality of apertures 34, establishing communication between the interior of the pneumatic chamber 3 and the interior of the auxiliary air chamber 5. These apertures 34 are normally closed by a relief valve 35 shown most clearly in Fig. 3. It will be therein noted that the valve 35 is in the form of a flat, sheet-like section of reinforced rubber having a disk-like central portion 36 of a size to fit over and normally cover and close the apertures 34. The valve 35 is held in position to close the apertures 34, by means of rivets 37, or equivalent fastening elements, which pass through radially-extending tabs 38 integrally projecting from the disk-like central portion 36 of the valve 35.

The valve arrangement just described is such that when the wheels 16 pass over an obstruction in the road and the disk 9 and flexible annular diaphragm 8 are forced upwardly, thus compressing air in the chamber 3, some of the air thus compressed will be forced upwardly against the valve 35, which will be then urged upwardly and the air forced past it and particularly at the points 39 located between the tabs 38, to enter into the auxiliary air chamber 5 and thus relieve the excess pressure created in the pneumatic chamber 3 by the shock encountered by the wheels. At its center, the valve 35 is provided with a check valve 40 in the form of a constricted passage through which the increased air pressure then created in the auxiliary air chamber 5, may slowly leak back into the chamber 3 to normally maintain between said chambers, a state of equilibrium of air pressure in both of them.

The slightly domed top 41 of the auxiliary air chamber 5 is provided with a central opening indicated at 42, that is closed by a diaphragm 43 of reinforced rubber or other flexible and expansible material retained in position over the opening 42 by means of a clamping ring 44 through which bolts 45 extend to enter the top 41 of the chamber and seal the opening 42.

From the foregoing, the operation of the described structure will be readily understood. It will, of course, be understood that the several pneumatic chambers utilized in the described structure, are supplied with compressed air under adequate pressure from any suitable source, and which air pressure may automatically or otherwise be increased or decreased according to the loading of the vehicle. Such source may conveniently be in the form of a tank in which air under relatively high compression is supplied from a pump or storage tank. The air may be fed from the storage tank to the pneumatic chambers through any suitable controls, an example of such controls being disclosed in my co-pending application Serial No. 27,966, filed May 19, 1948, now Patent No. 2,663,569.

Assuming that the air in the chamber 3 is of the required pressure for a given load imposed on the vehicle, the load will be smoothly and easily borne by the structure described. When the wheels 16 ride over an obstacle in the road and are thus forced upwardly, the cables 17 and the annular diaphragm 8 readily permit such upward movement, and the air in the chamber 3 will be compressed and forced against the valve 35 to flex the same upwardly and permit the escape of the required quantity of air past it to flow into the auxiliary chamber 5. If the shock is a very severe one, the air pressure in the chamber 5 may be increased to an extent as to cause slight upward flexure of the diaphragm 43, which is thus, in effect, a safety valve. After the obstruction has been passed, the air thus displaced will slowly leak back from the auxiliary chamber 5 into the main chamber 3 by way of the slow-return valve 40.

Figure 5:
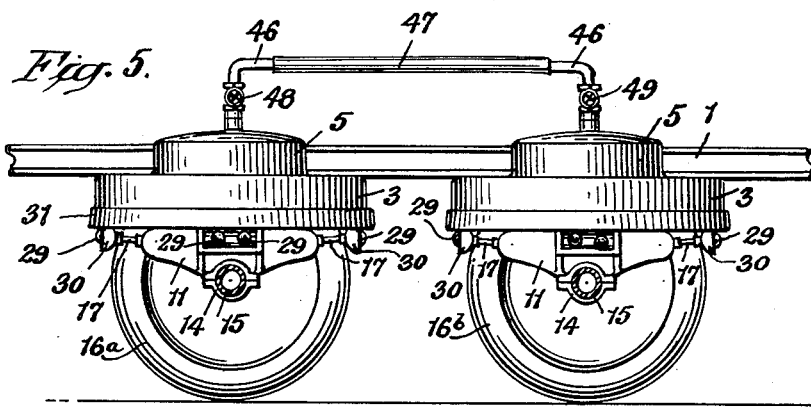
Fig. 5 shows an installation of the improved structure upon a chassis having twin pairs of rear wheels.

In the embodiment of the invention shown in Fig. 5, companion pairs of rear wheels are respectively shown at 16a and 16b. The suspension for each pair of wheels is the same as that described in connection with the structure of Figs. 1 to 4 inclusive. In this embodiment of the invention the two auxiliary chambers 5 are connected by a conduit 46, having a flexible central section 47, permitting independent movement of each pair of wheels without imposing strain on the conduit. Valves 48 and 49 are provided in the conduit, and by means of which equal pressure can be maintained in the two air chambers, or if circumstances require it, the pressure in one tank may be relieved and one pair of wheels elevated to permit the load to be carried on the other pair. Other advantages obtainable from this embodiment will be apparent to those skilled in this art.

Having described one embodiment of the invention, it is obvious that the same is not to be restricted thereto, but is broad enough to cover all structures coming within the scope of the annexed claims.

What I claim is:

1. In a vehicle, a chassis frame, a pneumatic chamber carried by the frame, a wheeled carriage below the chamber, said carriage having a disk constituting a central part of the lower wall of the pneumatic chamber, an annular flexible diaphragm having its outer marginal edge attached at the side wall of the pneumatic chamber, and its inner marginal edge attached to the outer edge of the disk, the chamber being provided at the top with a supplemental compartment, a valve located between the chamber and said compartment and adapted to be open by excessive pressure in the chamber to thereby permit the flow of air into the compartment and flexible cables extending between the carriage and parts of the pneumatic chamber.

2. In a vehicle, a tank providing a cylindrical air chamber located between the longitudinal frame members of the vehicle chassis, said tank having a side wall provided at its lower edge with an inwardly directed flange, an annular flexible diaphragm forming a part of the bottom wall of said tank, a disk forming the central part of the bottom wall of the tank, said disk having its peripheral edge attached to the inner edge of the annular diaphragm, said disk having seats arranged around its edge, the tank having seats around its edge, and adjustable cables extending between the seats on the disk and the seats on the tank.

3. In a vehicle, a pneumatic tank having a bottom wall composed of a central disk surrounded by a flexible annular diaphragm, the outer edge of the diaphragm being attached at the peripheral edge of the tank, and a plurality of radially-extending cables anchored at one end at the edge of the disk and anchored at the other end at the edge of the tank.

4. In a vehicle as provided for in claim 3, wherein curved seats are provided at the edge of the disk, compressible blocks on said seats, the ends of the cables bearing against said blocks, balls on the opposite ends of the cables, and curved seats at the edge of the tank against which the said balls are held.

5. In a vehicle, a pneumatic chamber having a lower wall composed of a central disk, an annular diaphragm having an inner edge attached to the peripheral edge of the diaphragm, the chamber having a side wall formed at the bottom with an inturned flange, the outer marginal edge of said disk being attached to said flange, a cradle attached to the disk, an axle attached to the cradle, wheels carried by the axle, and cables extending between the cradle and the edge of the pneumatic chamber, the cables being anchored at one end against a resilient seat.

6. In a vehicle, a pneumatic tank having a lower wall composed of a central disk surrounded by an annular flexible diaphragm, the outer edge of said diaphragm being attached at the lower edge of the peripheral wall of the tank, the tank having a partition dividing it into upper and lower chambers, valve means operative in said partition to permit the direction of air from the lower chamber to the upper chamber when rising shock is imposed on the wheels of the vehicle, the upper chamber being provided in its upper wall with an aperture, a diaphragm secured on the upper wall of the tank and located over the aperture therein and capable of upward flexure under excessive air pressure in the said upper chamber.

7. In a vehicle, a pneumatic chamber having a bottom wall composed of a central disk surrounded by an annular flexible diaphragm, a cradle attached to the disk, an axle attached to the cradle, the disk having a plurality of seats at its edge, the peripheral edge of the chamber having a plurality of seats, cables extending radially of the disk, the cables each having one end mounted on the seats on the chamber and having another end mounted on the seats on the disk.

8. In a vehicle construction as provided for in claim 7, wherein the seats on the disk are each provided with rubber blocks through which portions of the cable extend, and means for adjusting the effective lengths of the cables.

9. In a vehicle construction, a chassis frame having spaced longitudinal members, a cylindrical air chamber secured to the frame members, the chamber having a lower compartment and an upper compartment, valve means interposed between the compartments and permitting air under excessive pressure to flow from one compartment to the other, the lower compartment having a peripheral side wall, said lower compartment having a bottom wall composed of a central rigid disk and an annular flexible diaphragm, the outer edge of the disk being attached to the inner edge of the diaphragm, the outer edge of the diaphragm being attached to the lower edge of the peripheral side wall of the lower chamber, and cables extending from the peripheral side wall of the lower chamber to the peripheral edge of the disk, a cradle attached to the disk and located below the same, an axle attached to the cradle and wheels carried by said axle.

10. In a vehicle, a pneumatic tank having a bottom wall composed of a central disk surrounded by a flexible annular diaphragm, the outer edge of the diaphragm being attached at the peripheral edge of the tank, the inner edge of the diaphragm being secured at the periphery of the disk, a plurality of radially-extending flexible members disposed below the diaphragm, a pivotal connection for one end of each of said members at the edge of the tank, and a connection for the second end of each member at the periphery of the disk.

References Cited in the file of this patent

UNITED STATES PATENTS

| Number | Name | Date |
|---|---|---|
| 1,130,656 | Annable | Mar. 2, 1915 |
| 1,414,623 | Church | May 2, 1922 |
| 1,621,498 | Draiger | Mar. 22, 1927 |
| 2,299,900 | Jackson | Oct. 27, 1942 |
| 2,488,288 | Gouirand | Nov. 15, 1949 |
| 2,567,151 | Hornbostel | Sept. 4, 1951 |

FOREIGN PATENTS

| Number | Country | Date |
|---|---|---|
| 617,565 | Great Britain | Feb. 8, 1949 |